No. 645,012. Patented Mar. 6, 1900.
W. B. & L. C. REED.
SYSTEM OF OVERHEAD ELECTRICAL DISTRIBUTION.
(Application filed Sept. 13, 1899.)
(No Model.)
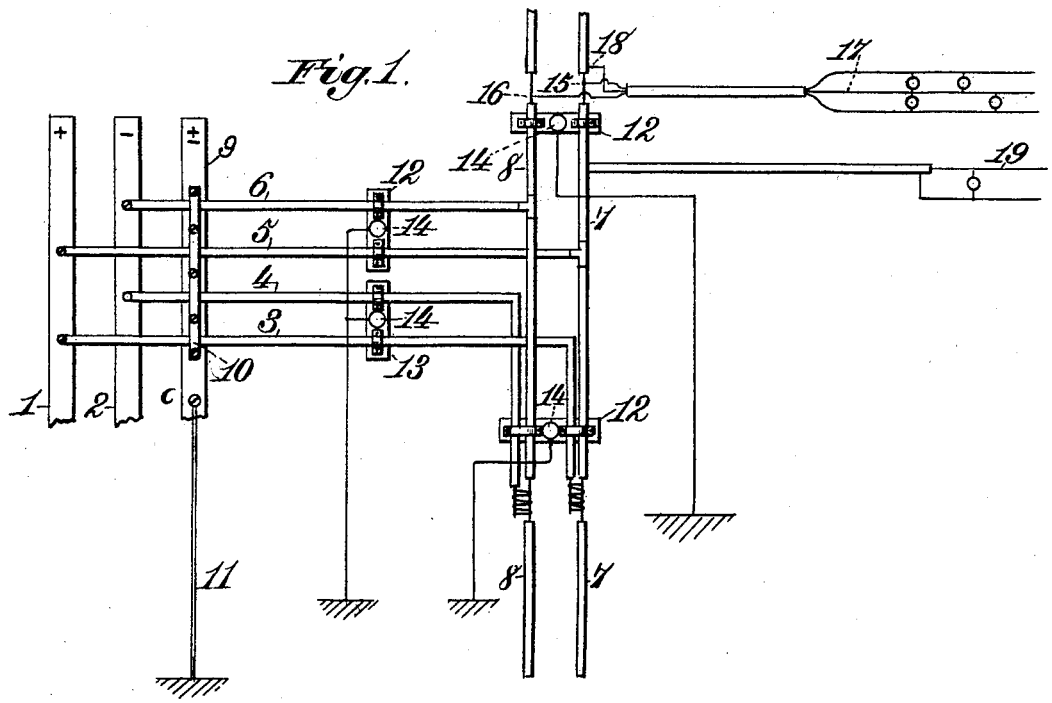
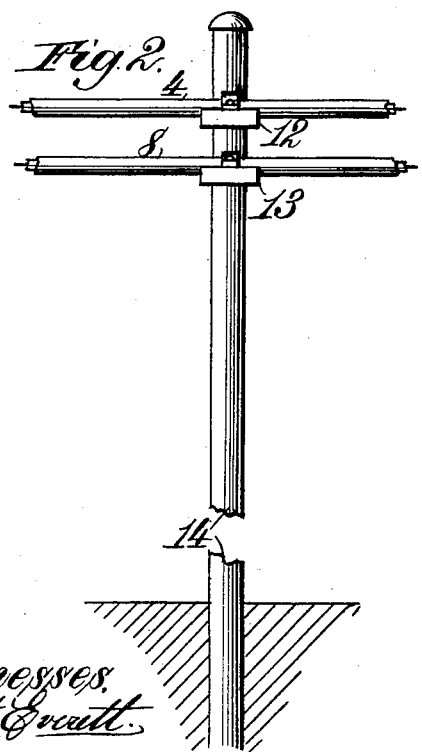
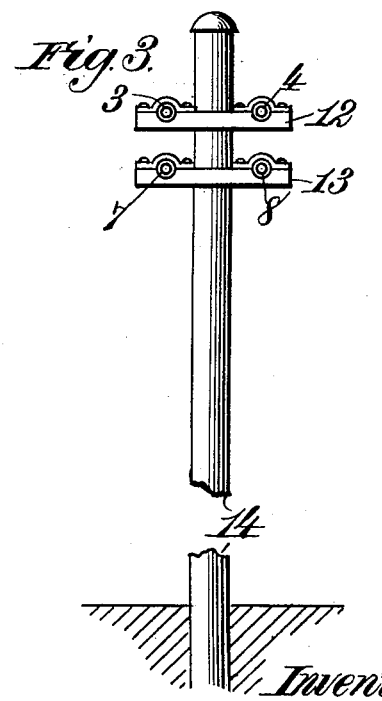
Witnesses.
Robert Everitt
Inventors.
Warren B. Reed.
Lyman C. Reed.
By James L. Norris, Atty.

UNITED STATES PATENT OFFICE.

WARREN B. REED AND LYMAN C. REED, OF NEW ORLEANS, LOUISIANA.

SYSTEM OF OVERHEAD ELECTRICAL DISTRIBUTION.

SPECIFICATION forming part of Letters Patent No. 645,012, dated March 6, 1900.

Application filed September 13, 1899. Serial No. 730,368. (No model.)

*To all whom it may concern:*

Be it known that we, WARREN B. REED and LYMAN C. REED, citizens of the United States, residing at New Orleans, in the parish of Orleans and State of Louisiana, have invented new and useful Improvements in Systems of Overhead Electrical Distribution, of which the following is a specification.

In an application for patent filed by Lyman C. Reed July 17, 1899, Serial No. 724,066, a protective system of electrical distribution was shown and described by means of which the house connections of the present systems of electrical distribution were effectually protected from high-tension currents due to crosses and the like on the exposed wires, and in an application filed by us August 21, 1899, Serial No. 728,010, an underground system of distribution was disclosed in which the neutral conductor-cables were dispensed with and in their stead the bonded and grounded metallic sheathings of the positive and negative conductor-cables were utilized to form a common neutral of practically-infinite capacity.

The present invention has to do with overhead three-wire systems of electrical distribution, with the object of obtaining all the advantages of both the systems above referred to—that is, of eliminating the neutral wire, with its resultant advantages, and of securing absolute protection from high-tension currents without the use of any apparatus or the cutting out of any portion of the service.

In the present system of low-tension three-wire distribution now in use the neutral wire has the same insulation as the positive and negative wires and is installed in the same manner. It is also the general practice to keep the neutral wire of overhead systems free from grounds, although some installations have the neutral permanently grounded at various points. In either case, however, the neutral has to be carefully installed and insulated from cross-arms, &c., so as not to come into contact with the other wires. It is necessary also to set the wires far enough apart to keep them from coming in contact with each other when swayed by the wind. For this reason overhead installations are very much spread out, making the construction expensive, producing an unsightly appearance, and exposing the conductors to the constant danger of crosses and falling wires. Besides, the system is exposed to high-tension currents and lightning. These combined disadvantages have resulted in the placing of the wires underground in congested centers. Underground construction, however, is too expensive to admit of use except in the central portions of the largest cities, and at present all wires, except in a few cities, are a constant menace to property and life. Besides this, in overhead three-wire systems the neutral wire as at present installed is usually of the same size as the outside wires for the mains, while for the feeders it is usually smaller. In our present system we do away with these neutral feeder and main wires and utilize the bonded and grounded exterior metallic casings of the positive and negative wires to form a common neutral for the whole system. By so doing we not only eliminate the neutral wires, but afford a protection from high-tension currents to the inclosed wires, and consequently to the entire system, in addition to securing numerous advantages in construction, &c., as will hereinafter appear.

The details of the invention will be fully set forth in the following description, and the novel features will be defined in the claims.

In the drawings forming part of this specification, Figure 1 is a diagrammatic view illustrative of our improved system. Fig. 2 is a side elevation of one of the poles on which the conductors are supported, and Fig. 3 is a similar view taken at right angles to Fig. 2.

Like reference-numerals indicate like parts in the several views.

The positive bus 1 and the negative bus 2 at the source of supply have leading from them, respectively, the positive feeders 3 and 5 and the negative feeders 4 and 6, the said feeders being connected with the positive and negative mains 7 and 8 at different points of the distribution, as shown. The said feeders and mains are incased in metallic sheathings, which are insulated from the interior conductors, and the sheathings of the feeders are bonded together and to the neutral bus 9 at the source of supply by a metallic strap 10. The neutral bus 9 is connected to ground by conductor 11. The sheathings of the feeders and mains are also bonded together and grounded at intervals throughout the distribution. This bonding and grounding is effected by means of metallic straps or clamps 12 13, which are directly attached to metallic supporting-poles 14, as clearly shown. The poles themselves are well set in the earth, so as to form a perfect ground for the metallic sheathings of the feeders and mains. This construction is clearly represented in detail in Figs. 2 and 3 of the drawings and diagrammatically in Fig. 1.

A three-wire house-service is shown connected with the positive and negative mains at 15 and 16, the insulated neutral 17 thereof being connected to the common neutral formed by the metallic sheathing of the positive and negative mains at 18. A two-wire house-service is also shown connected with the positive main 7, the interior conductor 19 of which is connected to the interior conductor of said main and the outer metallic sheathing of the service-lead is connected to the outer metallic casing of said main. These two house-service connections are shown to illustrate the means by which a service-circuit with an insulated neutral may be employed to conform with the present house-wires and a service where the metallic casing forms a portion of the common grounded neutral.

It is understood that the metallic sheathings of the feeders and mains are bonded together at every pole and grounded, and while we prefer to form the ground connections by the pole itself we do not limit ourselves to this specific means of grounding. The cables may be connected by any means to insure their effectual bonding, and the poles may be of wood with a grounded conductor attached thereto and to the sheathings, or the ground-conductor may simply be attached to the casings themselves. Still the use of metallic poles with no insulators whatever and having clamped directly thereto the metallic sheathings of the conductors, furnishing at one and the same time a metallic bond and ground, gives a simplicity of construction greatly to be desired. The unsightly cross-arms are thereby dispensed with and the weight of the cables is placed in close proximity to the pole itself. The fact that the cable-casings are of the same potential and are bonded together allows of their being placed side by side or tied or laid together along their entire length instead of having to be kept a certain distance apart, as in the present insulated systems. The simplicity of this construction, which brings the overhead wires into a minimum of space, together with the fact that they cannot be dangerous to life and property, obviates the chief objections to the placing of the wires overhead and avoids the vast expense which is necessary in placing the wires underground. Furthermore, the use of metallic poles, the doing away with cross-arms and insulators, the bringing of the great weight of the wires directly into the line of thrust of the pole, the safety of the cables permitting of shorter poles where the wires pass through trees, &c., the reducing of the number of wires by one-third, the preservation of the insulation of the wires, and the reduction of the general deterioration all operate to produce a great saving in the expense of installation and maintenance and to obtain absolute protection to the system as a whole.

As stated in our application Serial No. 728,010, above referred to, and as is well understood, the current flowing on a neutral wire is either positive or negative and is the difference between the load connected on the positive and negative wires. For this reason the neutral feeders are not usually installed of the same carrying capacity as the other wires, and if the system could be maintained in perfect balance these feeders might be entirely dispensed with. In practice, however, they have to be large enough to carry any excessive load due to accident or shut down on one side of the system. The current on the neutral bus at the source of supply is the resultant difference in amperes between the positive and negative load on the entire system. This in every well-managed station is carefully looked after, and an even balance on the system is maintained as far as possible. Our experience shows, however, that contrary to the generally-accepted opinion at present the resultant current at the neutral bus does not necessarily represent the total current carried by the neutral feeders. From the fact that the neutral feeders are insulated from each other and carry the resultant differences of current existing at their terminals, which current may be either positive or negative, it will be seen that the resultant current at the bus is the positive or negative excess carried by the feeder neutrals, and the actual amperes carried by these neutrals may be many times the resultant amperage on the neutral bus. In fact, our experiments show that even when the system is evenly balanced and there is no resultant load on the neutral bus the feeder neutrals carry current varying with the existing conditions of the load distribution on the mains. This will be the better understood when it is remembered that a system which shows a balance at the bus may be made up of a great number of differences of load at various points of the system, the balancing of which takes place over the neutral mains and neutral feeders in multiple with each other, the load carried by each being divided according to its resistance. It follows, then, that the lower the resistance of the neutral mains the less current will flow over the feeder neutrals, and in order to have no flow over the feeder neutrals or a perfect equalization of the neutral currents on the neutral mains themselves the neutral mains will have to be without resistance or of practically-infinite capacity. It also follows that when the system is unbalanced the feeder neutrals have not only to aid the neutral mains in equalizing the currents, but they have also to carry to the neutral bus the resultant excess of current, either positive or negative. It will be seen, therefore, that it is not only the excess of current-flow, either positive or negative, which causes loss of potential, tending to lower the potential on one side or the other of the system, but the local unbalancing of the load also causes an unevenness of potential at many points affecting the regulation of the voltage at these points regardless of the regulation at the source of supply.

In our improved system, where we substitute metallic-sheathed cables for the positive and negative conductors of the system and bond and ground the cable-sheathings, we do not increase the difference of potential between the conductors and ground, but we do entirely overcome the danger which now exists, where the neutral is insulated, of obtaining a maximum difference of potential of the system between one outside leg and ground. Furthermore, by inclosing these overhead wires in metallic sheathings we prevent the leakage now existing, which is due to the defective insulation of exposed conductors, the metallic casings affording a thorough protection to the insulation from the weather. It is obvious also that these sheathings will protect the interior conductors from all contact with crossing wires, the sheathings furnishing a conductor for any current coming in contact therewith. As the sheathings or casings are effectually grounded at every few feet of the system the said sheathings may be considered as an elevated section of the earth, and there cannot be any difference of potential between them and the earth. It is well known that in all systems of distribution where a neutral is employed there cannot be any difference of potential between the neutral and the earth when both of the other conductors are insulated. It will be seen, therefore, that by making our neutral and the earth practically one and the same by supplying a system of bonded and grounded metallic sheathings for our one common neutral to all the positive and negative wires we maintain this neutral at the same potential as the earth, irrespective of whether there are any grounds on the other two wires or not. Any grounds on the other two wires occurring on the outside distributing system necessarily occur by a breakdown or leakage between the interior conductor and its surrounding casing. This may be a leakage or a short circuit; but in either case the grounding of this conductor to the casing in no way affects the difference of potential between the earth and the casing, and these grounds, leakages, or short circuits operate and are of the same nature as the load furnished by the translating devices on the systems, which are connected between the outside conductor and the ground or neutral. Furthermore, the crossing of high potentials with our common neutral immediately equalizes the difference of potential existing between the high-tension wire and the earth. Under no conditions, therefore, can the difference of potential between the interior conductors of the cables and the cable-casings, and therefore between the conductors and any other wire of any potential, be more than the voltage of one side of the three-wire system. It will be noted then that in our system there is not only a neutral and a ground on the neutral, but this ground is made in such a manner as to prevent any outside current from affecting either interior conductor. Where an insulated neutral wire of the present system is grounded in the endeavor to obtain protection from incursions of high-potential currents, paths furnished by all devices connected between this neutral and the outside wires are in parallel with the intentional grounds placed on the neutral wire, and when a high-tension cross occurs on the neutral wire the current divides over all these parallel paths to earth, and when the cross occurs on either outside wire the high-tension current has to flow over the translating devices between the outside wire and neutral to ground. Consequently the grounding of an insulated neutral cannot afford the protection to the other conductors desired. By providing the casings of the outside conductors according to our system with an effectual ground, which at the same time is a neutral, no cross can take place with either inner conductor, and the crossing of a high-tension current with the neutral, which is the earth itself, does not furnish any parallel paths to earth through translating devices, and as the cross can only occur on the neutral the translating devices can never carry high-tension currents, as in the present insulated and grounded neutral system. Our improved system therefore furnishes absolute protection to the interior conductors from high-tension currents and provides for the delivery to the house-service of a current with the same potential that is impressed at the source of supply. For the same reasons any lightning discharge to the bonded and grounded casings becomes simply a discharge to the earth at the point affected and does not enter buildings fed by the system, as at present, thereby avoiding the loss now incurred by the destruction of translating devices and other property and doing away with the use and consequent expense of lightning-arresters.

As is further stated in our application Serial No. 728,010, above referred to, the metallic-sheathed cables now on the market, which are manufactured for underground work, have a relative conductivity of about one to seven between the casing and the conductor, where both casings of a circuit are bonded to form the neutral. The conductivity of the casings can be made the same as the interior conductors, if desired, or in any other ratio, and the casings may be made of any suitable metal desired, so as to be adaptable to overhead construction. The bonding and grounding of all the cable-casings at every available point, however, increases the carrying capacity of the neutral many fold and permits of the use of a lighter sheathing than would at first be considered possible; but not only is the carrying capacity increased, but the doing away with the many insulated neutrals and the substituting therefor of one common neutral reduces the total current to be carried by this neutral to the resultant neutral current, which appears in the present system only at the neutral bus at source of supply. This is made clearer by remembering that with insulated neutrals as at present installed each feeder neutral is carrying positive or negative currents to be bussed at the source of supply, and the total current on the feeders may be many times the resultant current after the differences have been balanced. The bonding and grounding of all the cable-casings at every pole throughout the entire system neutralizes or busses these currents practically at their origin, and the only current which may be considered as existing on the neutral of our system is the resultant difference between the positive and negative loads at source of supply. This bonding and grounding of all the cable-casings is effected at every pole and at other convenient points, and as it takes place at every few feet throughout the entire system it neutralizes at each and every one of the points all difference of balance, leaving only the excess. This is equivalent to extending over the entire system of feeders and mains a neutral bus having a capacity practically equivalent to infinity. To illustrate further, instead of having a system of many insulated feeders and mains, let it be supposed that in their place, a vast metal plate is substituted. Into this plate the hundreds of house-services as at present installed would pour their unneutralized differences, which immediately cancel each other and leave on the whole plate a resultant only, which is connected at some point with the source of supply. Our system therefore also eliminates all loss due in the system now in vogue to the unbalanced currents over the insulated neutral mains and feeders, and effects not only a saving in operation, but also a vast improvement in the regulation of the potential of the system. In the present overhead system, where the neutral for each set of mains is of the same carrying capacity as the outside wires and for each set of feeders is almost the same capacity, it will be seen that if these neutrals were all bonded together and grounded the common neutral formed would have a much greater capacity than at present, and a saving would be accomplished and a better regulation effected. In fact, the common neutral formed would in all portions, except on tag-lines, have a large amount of idle copper which could be removed without detriment to the system. If in the present system of overhead three-wire distribution, therefore, the neutrals were, as above stated, bonded and grounded, the advantages of preventing loss of potential and obtaining closer regulation would be effected, but the advantages of protection, simplicity of construction, and others above set forth could not be attained.

It may be further considered that the substitution of the metallic-sheathed cables for the insulated conductors of present system amounts, practically, to taking all or a portion of the metal of the separate neutral wire and sheathing the other two insulated conductors with it.

When it is taken into consideration that our system is more ecomical in construction, repairs, and increased life of all the material used, regardless of the other advantages, its desirability over the present system will be appreciated.

As stated in our former application, Serial No. 728,010, above referred to, while it appears that the specification is descriptive of a direct-current system of distribution an alternating system may be considered as having a positive and negative side for an instant of time, this potential varying with the frequency of the alternations employed. It is manifest that our system is adapted to and intended to be used with either alternating or direct current. Furthermore, we have referred herein to the several busses at the source of supply. It is obvious, however, that where the system is fed directly from a dynamo or from single or "banked" transformers without the intervention of busses the dynamo or other source of supply corresponds in every way to the busses referred to in the description and claims.

Having now described our invention, what we claim as new, and desire to secure by Letters Patent, is—

1. A three-wire system of overhead electrical distribution comprising a plurality of sets of positive and negative conductors in metallic coverings which are insulated therefrom, metallic poles or supports for maintaining said conductors in elevated position, the coverings of the different sets of conductors being electrically bonded to each other and to said poles, through which they are also grounded, and a common neutral formed by said coverings.

2. A three-wire system of overhead electrical distribution comprising a plurality of sets of positive and negative conductors in metallic coverings which are insulated therefrom, metallic poles or supports for maintaining said conductors in elevated position, the coverings of the different sets of conductors being electrically bonded to said poles and to each other through said poles, and a common neutral formed by said coverings.

3. A three-wire system of overhead electrical distribution comprising a plurality of sets of positive and negative conductors in metallic-sheathed cables, metallic poles or supports for maintaining said cables in elevated position, the sheathings of the different sets of cables being electrically bonded to each other and to said poles through which they are also permanently grounded, and a common neutral formed by said sheathings.

4. A three-wire system of overhead electrical distribution comprising a plurality of sets of positive and negative conductors in metallic-sheathed cables, metallic poles or supports for maintaining said cables in elevated position, the sheathings of the different sets of cables being electrically bonded to each other and to said poles through which they are also permanently grounded, a common neutral formed by said sheathings, and house-circuits, the positive and negative wires of which are respectively connected to said positive and negative conductors and the neutral wire of which is connected to said common neutral.

5. A three-wire system of overhead electrical distribution, comprising positive, negative and neutral busses at the source of supply, a plurality of sets of positive and negative feeders and mains leading respectively from the positive and negative busses, metallic coverings for said feeders and mains which are insulated therefrom, grounded metallic poles or supports for maintaining said feeders and mains in elevated position, the coverings of the different sets of feeders and mains being electrically bonded to each other and to said poles, and a common neutral for all of said feeders and mains formed by said coverings which are connected with the neutral bus, whereby the different currents of opposite polarity may be neutralized at their source and the resultant excess may be taken from the neutral bus.

In testimony whereof we have hereunto set our hands in presence of the subscribing witnesses.

WARREN B. REED.
    LYMAN C. REED.

Witnesses to signature of Warren B. Reed:
 HARRY H. WATERS,
 ABRAHAM GOLDBERG.

Witnesses to signature of Lyman C. Reed:
 WM. M. STOCKBRIDGE,
 GEO. W. REA.